US008474031B2

(12) United States Patent
Vennelakanti et al.

(10) Patent No.: US 8,474,031 B2
(45) Date of Patent: Jun. 25, 2013

(54) ACCESS CONTROL METHOD AND APPARATUS

(75) Inventors: Ravigopal Vennelakanti, Bangalore (IN); Savio Fernandes, Sunnyvale, CA (US)

(73) Assignee: Hewlett-Packard Development Company, L.P., Houston, TX (US), ( * ) Notice: Subject to any disclaimer, the term of this patent is extended or adjusted under 35 U.S.C. 154(b) by 1131 days.

(21) Appl. No.: 11/917,346

(22) PCT Filed: Jun. 28, 2005

(86) PCT No.: PCT/IN2005/000217
§ 371 (c)(1),
(2), (4) Date: Dec. 13, 2007

(87) PCT Pub. No.: WO2007/000772
PCT Pub. Date: Jan. 4, 2007

(65) Prior Publication Data
US 2010/0138908 A1    Jun. 3, 2010

(51) Int. Cl.
G06F 9/00 (2006.01)
G06F 15/177 (2006.01)

(52) U.S. Cl.
USPC ............. 726/11; 726/1; 726/2; 726/3; 726/4; 726/5; 726/6; 726/9; 726/10; 726/27; 726/29; 726/34; 713/1; 713/100; 713/156; 713/165; 713/166; 713/172; 713/173; 713/182; 713/185

(58) Field of Classification Search
USPC ............. 726/5, 10–11; 713/165–166, 1, 100
See application file for complete search history.

(56) References Cited

U.S. PATENT DOCUMENTS

| 7,475,235 | B1 * | 1/2009 | Bernardy et al. | 713/1 |
| 7,587,484 | B1 * | 9/2009 | Smith et al. | 709/224 |
| 2003/0163728 | A1 * | 8/2003 | Shaw | 713/201 |
| 2003/0208447 | A1 | 11/2003 | Stefik et al. | |
| 2004/0010717 | A1 * | 1/2004 | Simec et al. | 713/201 |
| 2004/0054907 | A1 * | 3/2004 | Chateau et al. | 713/175 |
| 2004/0139312 | A1 * | 7/2004 | Medvinsky | 713/150 |
| 2005/0137889 | A1 * | 6/2005 | Wheeler | 705/1 |
| 2006/0026670 | A1 * | 2/2006 | Potter et al. | 726/7 |
| 2006/0135121 | A1 * | 6/2006 | Abedi et al. | 455/410 |
| 2007/0118756 | A2 * | 5/2007 | Oliphant | 713/182 |
| 2007/0162973 | A1 * | 7/2007 | Schneier et al. | 726/22 |
| 2008/0172366 | A1 * | 7/2008 | Hannel et al. | 707/3 |

\* cited by examiner

FOREIGN PATENT DOCUMENTS

| EP | 1175039 A | 1/2002 |
| WO | WO 00/48063 A | 8/2000 |

*Primary Examiner* — Edan Orgad
*Assistant Examiner* — Jenise Jackson (57) ABSTRACT

A method of controlling access to computing resources, comprising providing a first computing device with access to a database containing data indicative of computing resources access to which is controlled by the first computing device and a minimum security capability that a second computing device must possess to access the respective resources, assigning the second computing device a security capability, providing the second computing device with data indicative of the security capability, configuring the first computing device to respond to data indicative of the security capability and data indicative of a desired access from the second computing device by ascertaining the minimum required security capability corresponding to the desired access and by comparing the minimum required security capability with the security capability of the second computing device, and providing the desired access if the security capability of the second computing device meets the minimum security capability for the desired access.

21 Claims, 6 Drawing Sheets

ACCESS CONTROL METHOD AND APPARATUS

FIELD OF THE INVENTION

The present invention relates to a method and system for controlling access to computing devices from other (particularly portable) computing devices (including electronic devices with data manipulation capacity), such as mobile telephones and personal digital assistants.

BACKGROUND OF THE INVENTION

Many organizations wish to permit external access to their computers and the data or software provided thereon in a secure manner. Existing mechanisms for controlling such access typically employ user credentials, such as by requiring external users to provide a recognized username and, optionally, corresponding password. The provision of such user credentials may be automated, such as by embedding the user credentials in the user's device or by using as user credentials some data (such as a sim card number in a mobile telephone) uniquely associated with the user device. However, the organization then assumes that the user's system or device that is being used to access the organization's server or its content is secure and reliable. Nevertheless, this assumption may be valid if the user's system or device is a desktop computer or the like that is located and operates within the periphery of the firewall of the organization's computer system.

More recently, however, numerous other devices (such as mobile telephones and personal digital assistants) have been provided with the capacity to access computers remotely, and are being used to access, download and cache sensitive information. Mobile devices are regarded as greatly enhancing user productivity by allowing ready access to data, but mobile device security is often inadequate and may introduce new security threats not posed by some existing fixed systems.

One security threat introduced by mobile devices arises from their size, which make such devices vulnerable to theft and loss; this makes them targets for thieves seeking to intercept confidential data. Also, many mobile devices are equipped with wireless web capabilities and hence are able to seamlessly access the internet with negligible security. Certain mobile devices can beam data (such as by infrared communication) to other comparable devices, allowing compatible mobile devices to send information and files to one another wirelessly. This potentially allows viruses to be easily exchanged between these devices owing to the lack of firewall software.

Another vulnerability arises during the synchronization of a mobile device with a desktop or comparable computer. During synchronization, a mobile device infected with a virus may transmit that virus to the computer; if that computer is networked to other computers, the virus may then be spread throughout an entire organization. Finally, mobile devices have relatively small memories, processing and battery power, and hence have limited room for existing security features.

Typically, existing approaches to ameliorating these problems address specific areas of security threats relating to mobile devices at the application level and, to some extent, at the operating system space. These approaches attempt to secure devices from various security threats faced in the data store space, data transit space or anti-virus space. However, they are ad hoc, lack standardization and cannot be universally deployed.

One specific approach includes classifying the data to be accessed according to category of sensitivity (such as of "high", "medium" and "low" confidentiality). Access is then granted according to user identity (as described above) and each user's authorization to access the different categories of data.

Credant Technologies, Inc. (a Delaware corporation) provides a software solution whereby a report is transmitted from the mobile device to the main computer (the "server" in this scenario) containing the identity of the mobile device (the "client"), of the model of the mobile device and of the security software installed on the device. According to this approach, therefore, a client-side software module reports these characteristics to the server. However, this client software module can be "spoofed", rendering the report untrustworthy. Also, this lookup is static; it is not possible to determine dynamically the security capabilities of the client at any time.

Further, the lookup in this approach is based on application names, giving rise to very weak binding, and there is no binding between the sensitive data and the device. Access control is, again, granted based only on the authenticated user's role.

SUMMARY OF THE INVENTION

According to one embodiment, the present invention provides a method for controlling access to computing resources. The method includes providing a first computing device with access to a database containing data indicative of a plurality of computing resources (such as data, software or other computing devices) access to which is controlled by said first computing device and a minimum level of required security capability that a second computing device must possess to be provided with access to said respective resources, assigning said second computing device a security capability (such as in the form of a security capability classification) and providing said second computing device with data indicative of said security capability (such as in a digital certificate). The method further includes configuring said first computing device to respond to receiving said data indicative of said security capability and data indicative of a desired access from said second computing device by ascertaining the minimum level of required security capability corresponding to said desired access and by comparing said minimum level of required security capability with said security capability of said second computing device and providing said desired access if said security capability of said second computing device meets said minimum security capability for said desired access.

BRIEF DESCRIPTION OF THE DRAWING

In order that the invention may be more clearly ascertained, embodiments will now be described, by way of example, with reference to the accompanying drawing, in which.

DETAILED DESCRIPTION OF THE EMBODIMENTS

Figure 1:
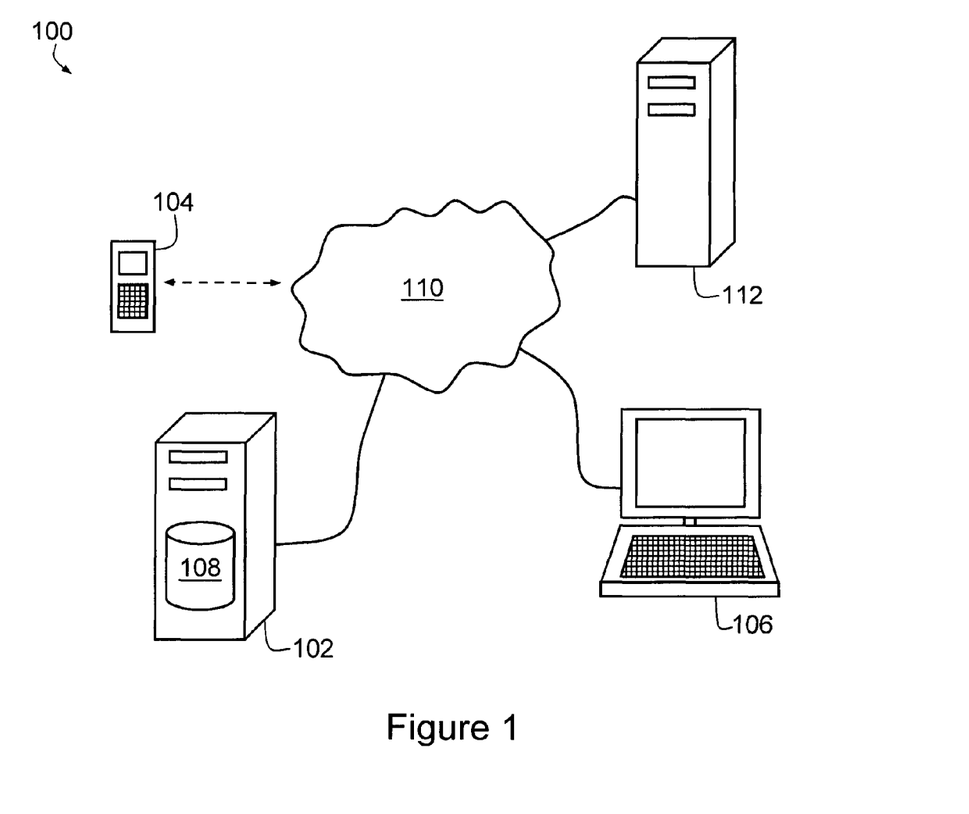
FIG. 1 is a schematic view of an access control system according to an embodiment of the present invention.

According to one embodiment in the present invention there is provided an access control system, shown generally at 100 in FIG. 1. The system 100 includes a remote authentication server 102 and a mobile user computing device, in this embodiment mobile telephone 104. It will be appreciated, however, that the user computer could alternatively be in the form of a personal digital assistant (PDA), a portable computer 106 or other mobile computing device. Authentication server 102 constitutes an authentication server for determining whether access to a computing resource requested by mobile telephone 104 should be provided. Authentication server 102 includes a security metric database 108 (described in detail below).

It will be appreciated by those skilled in this art that, although the mobile device in this embodiment is a mobile telephone, the mobile device could be in the form of a mobile computing device with appropriate wired or wireless capability. The mobile device could communicate by means of, for example, Active Sync, WLAN, GSM, GPRS, CDMA, Bluetooth, IR or the like.

Authentication server 102 and mobile telephone 104 communicate electronic via telecommunications network 110, including portions of the internet and a mobile telephony network. A secure channel is employed for all interactions between the mobile telephone (or other mobile user device) and the authentication server 102.

Mobile telephone 104 includes software (or firmware) to determine the security software installed on the system 100, software to store security capability metrics in a secure and reliable manner on mobile telephone 104, software to reliably report its security capability metrics to a requesting party after proper authentication, and software to sign and encrypt any data to be reported. Mobile telephone 104 also includes a unique identifier that uniquely identifies the mobile telephone 104 globally, a secure data store for maintaining the confidentiality and integrity of stored data, and a unique key pair for signing and encrypting data locally (access to these keys being based on presentation of proper authorization credentials). The software components are provided in the mobile telephone 104 as a trusted module. A Trusted Platform Module (TPM) chip (or suitable alternative with comparable capabilities) is also provided in the mobile telephone 104. The TPM chip provides a tamper proof storage and trusted environment for execution of this software module and for measurements (such as of security) on the mobile telephone 104. This measurement of security capabilities is dynamic and employs application certificates and not merely application names. This provides strong binding, and makes it difficult for an intruder to gain unauthorized access to the mobile telephone 104 even if masquerading under the IP address of a trusted host (a technique known as 'spoofing').

The system 100 is configured to control access by mobile telephone 104 to data or other computing resources provided either on authentication server 102 or on a network resource 112 (also in electronic communicate via telecommunications network 110 with mobile telephone 104). Network resource 112 may be in the form of, for example, a computer or a printer, or data or a software package located on a computer.

The mobile telephone 104 includes a digital certificate provided, for example, by a Device Certification Authority (DCA), a trusted third party that uses a suitable security capabilities metric to certify that a device complies with a certain category of security. The DCA determines what security capabilities are possessed by the mobile telephone 104 based on its level of compliance with that metric. The security capabilities of the device are stored as mobile device specific extensions in an X.509 v3 digital certificate. In an alternative embodiment, the DCA in fact determines the security class of the device from those capabilities, and stores that classification in the mobile device specific extensions of the digital certificate.

A basic X.509v3 client authentication digital certificate binds a public key to a particular user, which may be used to authenticate the user to an organization. It does not convey any information about the computing device from which the user is connecting. When a user connects to authentication server 102 from mobile telephone 104, the authentication server 102 is configured to identify the credentials, security capabilities and configuration of mobile telephone 104, as well as the user's credentials, in order to control access.

In this embodiment, the mobile device's credentials, security capabilities and configuration parameters are conveyed in extension added to the X.509v3 client authentication certificate. It will be appreciated by those in the art that by incorporating device credentials in a X509 certificate augments the intended functionality of such digital certificates is enhanced.

The certificate attested by the trusted DCA is installed in the mobile telephone 104 before mobile telephone 104 is deployed for use in accessing the controlled computing resources. Access control policies (such as those of a company or other organization) are established so that all access to resources is denied if the user device does not present a valid device certificate at the time of authentication and authorization.

As described above, authentication server 102 includes security metric database 108 that contains a metric for classifying devices based on their security capabilities. The metric categorizes user devices according to security capability depending on level of compliance to a set of security standards and security requirements specifications. The metric also indicates what level of security capability classification is required in order to access for any particular computing resource, whether that resource comprises data or a software package located on the authentication server 102 or on network resource 112, or otherwise. The metric is also stored in a TPM chip to ensure its integrity.

It should also be noted that the security capability required to access a particular computing resource can also depend on the identity of the user (as determined either from username and password data or the identity of the mobile telephone 104). This enables an organization to enforce access control based on any combination of the following parameters: 1) the role or capacity of the user, 2) the unique Device Identity of the mobile device from which the user is connecting, 3) the security Capability of the mobile device from which the user is connecting, 4) the hardware and software configuration of the mobile device from which the user is connecting, and 5) the current software state of the mobile device from which the user is connecting.

Briefly, therefore, the authentication server 102 is configured, upon receipt of a request for access from mobile telephone 104, to query the mobile telephone 104 for the digital certificate and the runtime security capabilities measurements, and to look up the metric database 108 to verify that mobile telephone 104 belongs to the required class of security based on its level of compliance with the metric. Based on this information, the authentication server 102 assesses the request for access to the requested resources.

Figure 2:
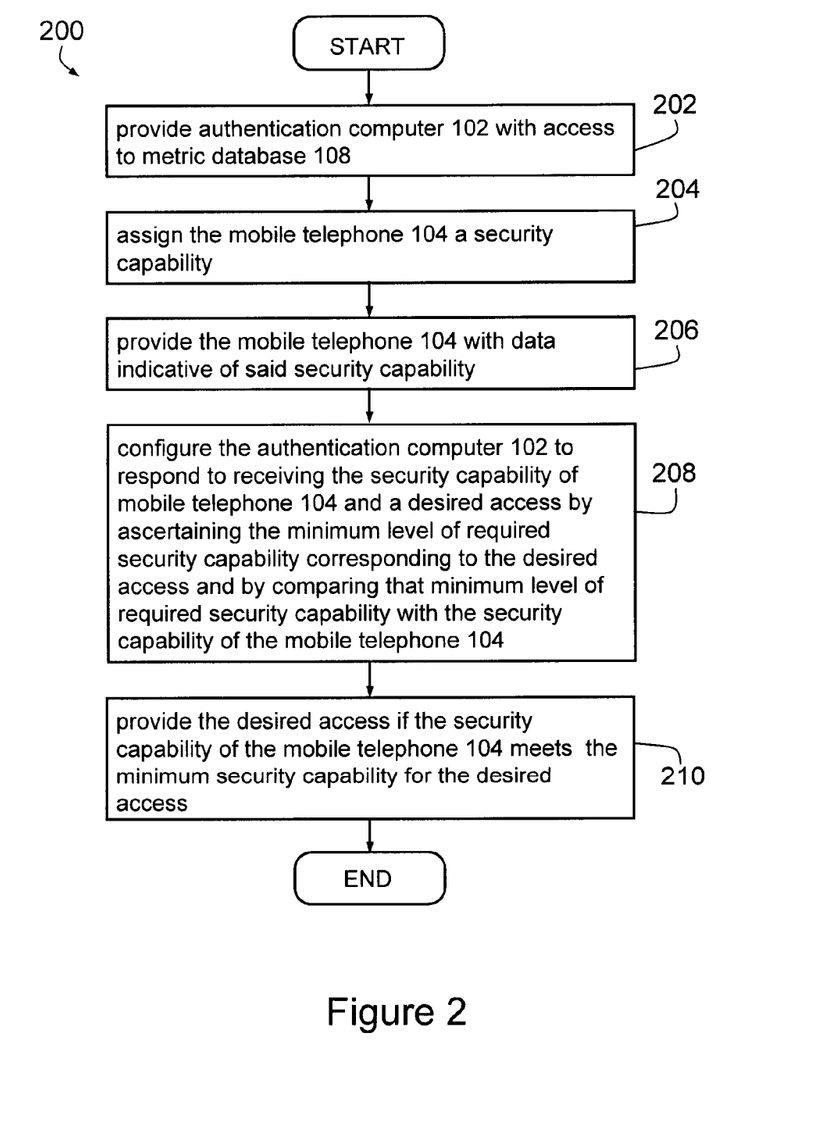
FIG. 2 is a flow diagram of a method of controlling access by means of the system of FIG. 1 in accordance with an embodiment of the present invention.
Figure 3:
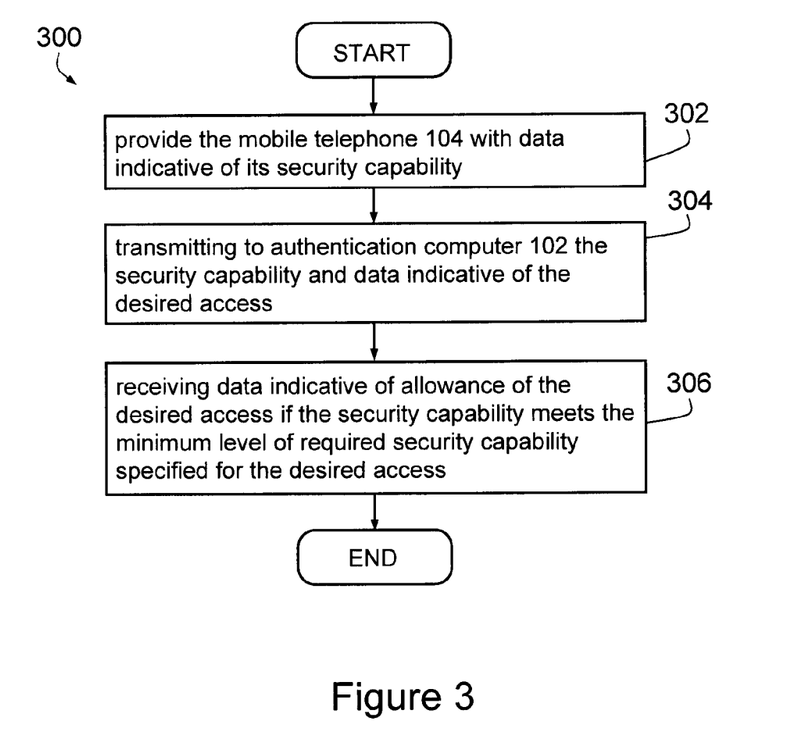
FIG. 3 is a flow diagram of a method of controlling access by means of the system of FIG. 1 from a user perspective in accordance with an embodiment of the present invention.
Figure 4:
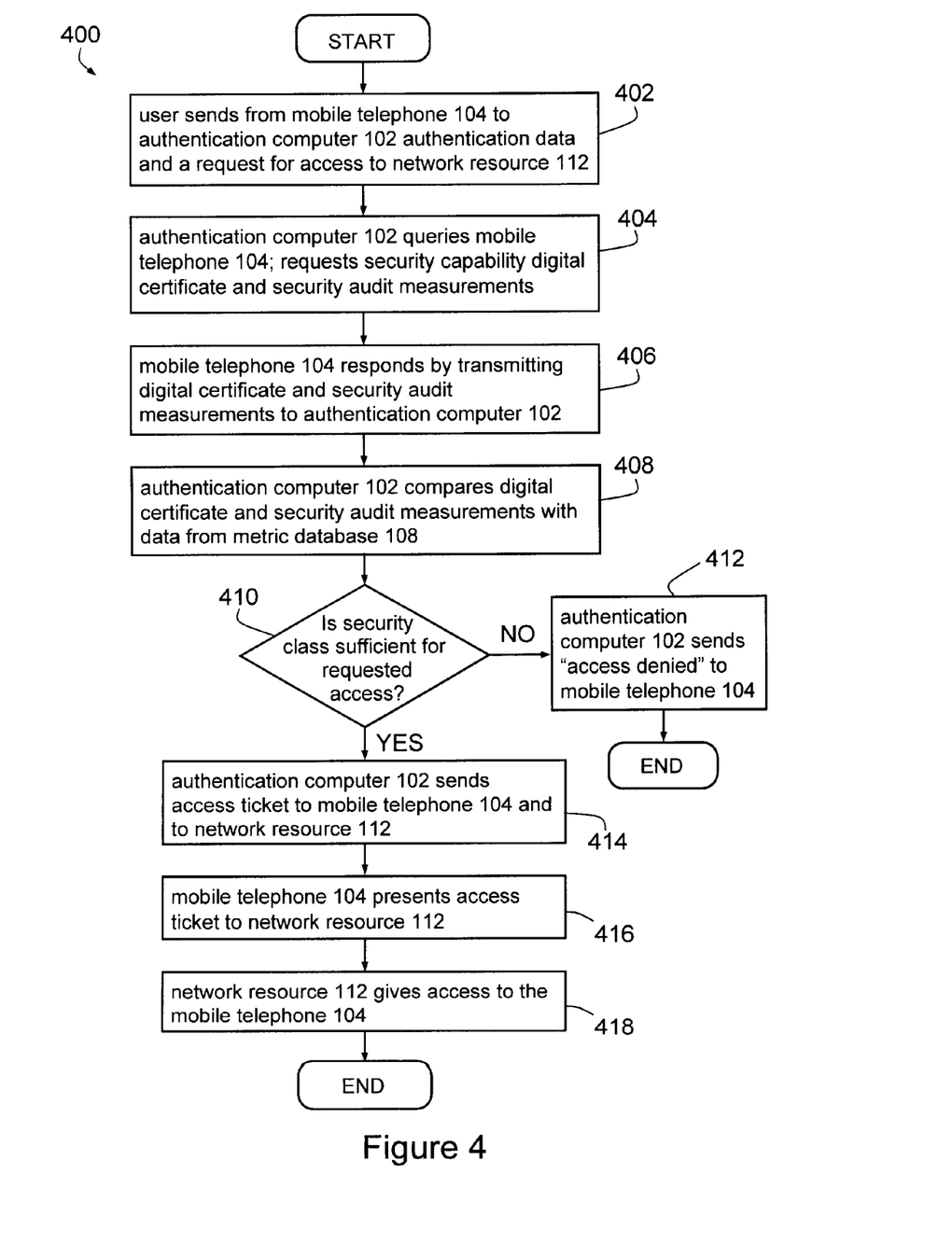
FIG. 4 is a functional flow diagram of a method of controlling access by means of the system of FIG. 1 in accordance with an embodiment of the present invention.

Accordingly, FIG. 2 is a flow diagram 200 in broad terms of the general method that is followed according to this embodiment for controlling access to a desired computing resource by means of mobile telephone 104. FIG. 3 is a flow diagram 300 of the same general procedure, but viewed from the user's perspective. FIG. 4 is a flow diagram 400 of the same procedure but including more functional detail.

Thus, referring to FIG. 2, the method includes—at step 202—providing authentication computer 102 with access to metric database 108, which contains data indicative both of computing resources access to which is controlled by authentication computer 102 and of a minimum level of required security capability that mobile telephone 104 must possess to be provided with access to each respective computing resource.

At step 204 the method includes assigning the mobile telephone 104 a security capability and, at step 206, providing the mobile telephone 104 with data indicative of its security capability.

At step 208 the method includes configuring the authentication computer 102 to respond to receiving—from mobile telephone 104—data indicative of the security capability of mobile telephone 104 and of a desired access by ascertaining the minimum level of required security capability corresponding to the desired access and by comparing that minimum level of required security capability with the security capability of the mobile telephone 104.

At step 210 the method includes providing the desired access if the security capability of the mobile telephone 104 meets the minimum security capability for the desired access.

Referring to FIG. 3, the method of controlling access of this embodiment may also be viewed from the perspective of a user of the mobile telephone 104, who desires access to a computing resource. Accordingly, at step 302 the method includes providing the mobile telephone 104 with data indicative of its security capability. At step 304 the method includes transmitting to the authentication computer 102 the security capability and data indicative of the desired access, so that the authentication computer 102 can assess whether the security capability meets a minimum level of required security capability specified for the desired access. Finally, at step 306 the method includes receiving data indicative of allowance of the desired access if the security capability meets the minimum level of required security capability specified for the desired access.

The method of this embodiment—as well as some optional steps—are explained further in functional terms by reference to the flow diagram of FIG. 4. Thus, referring to FIG. 4, at step 402 the user sends to authentication server 102, by means of mobile telephone 104, a request for access to network resource 112. The request includes device credentials that identify the mobile telephone 104 and identifies the desired access. Optionally, the request can include user identity/authentication data (comprising, for example, the user's username and password).

At step 404, the authentication server 102—upon receipt of the access request—queries the mobile telephone 104 and requests: 1) the security capability digital certificate and 2) security audit data. The latter, which are the result of a security audit computed by the TPM in real-time, indicate the current hardware and software configuration and the current software state of the mobile device (mobile telephone 104) from which the user is connecting. The mobile telephone 104 responds—at step 406—by transmitting the digital certificate and the security audit measurements to authentication server 102.

At step 408, the authentication server 102 checks the validity and currency of the digital certificate and of the device's credentials by cross checking against the real-time security audit data, determines the class of the mobile telephone 104 using the information in the device security certificate and the security audit measurements by verifying against the classification specification lookup tables in metric database 108, and ascertains—again from the metric database 108—the required security capability for the requested access.

At step 410, the authentication server 102 determines whether the security class of the mobile telephone 104 is sufficient for the requested access, by comparing the security class with the required security capability. If not, the authentication server 102—at step 212—sends the mobile telephone 104 an "access denied" message and processing terminates.

If the security class of the mobile telephone 104 is sufficient for the requested access, processing continues at step 414 where the authentication server 102 sends a digital "access ticket" to both the mobile telephone 104 and network resource 112. The ticket is valid for the current session only.

At step 416, the mobile device presents this ticket to the network resource 112 and, at step 418, is given access by the network resource 112.

Authentication server 102 can report several parameters about mobile device (such as mobile telephone 104) to which it grants access: 1) the unique Device Identity of the device, 2) the security capability of each device, 3) the hardware and software configuration of the device, and 4) the current software state of the device.

Discrete and selective access to the network resource 112 from mobile devices (such as mobile telephone 104) is achieved by classifying mobile devices based on their security class compliance. This classification of devices allows the development of levels of trust associated with networked resources and particular devices.

Figure 5:
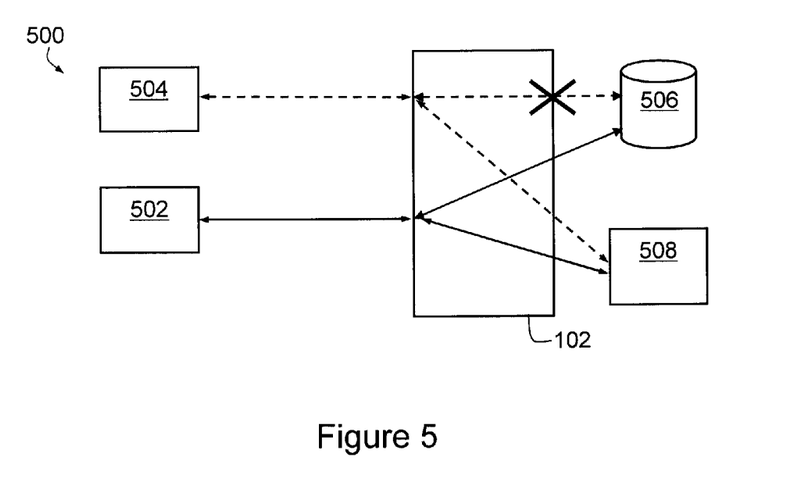
FIG. 5 is a schematic representation of the selective granting of access to common networked resources by means of the system of FIG. 1 in accordance with an embodiment of the present invention.

For example, mobile telephone 104 (and other mobile devices that may be used with system 100) may belong to one of two security classifications: Class A and Class B, where a Class A device has superior security capabilities than does a Class B device. In this case, even though both a Class A device and a Class B device may request access to common (e.g. corporate) networked resources, the authentication server 102 can selectively grant or deny access to certain resources based on the trust developed in the devices due to their security class capabilities. This is illustrated schematically at 500 in FIG. 5, in which a Class A device 502 and a Class B device 504 both request access to a networked database 506 and a networked printer 508. The present embodiment allows the authentication server 102 to be configured (by means of the data in security metric database 108) to selectively grant access to the printer to Class A or Class B devices, but to the database to only Class A devices. This means that an organization can monitor and administer security at a finely resolved level, detect and prevent malicious attacks, protect, recover or destroy data should a user leave the organization or lose their device, and inhibit the spreading of viruses from one network resource to another via mobile devices.

The security metric used to classify each mobile device is created according to the five main factors that govern information security: authentication, confidentiality, integrity, authorization and non-repudiation. The classification of each mobile device is based on its security capabilities at the Hardware Layer/OEM Layer, OS (operating system) Layer and the Application Layer in order to address these factors. For the mobile device to qualify to belong to a certain class of security, the device must have security objectives met at the relative layers to achieve the required level of security.

It should be noted, however, that the class of the device is determined by identifying the security capabilities of the device that come pre-installed from the manufacturer as part of its ROM image. This avoids the loss of user-installed applications after a hard reset. The classification metric is then arrived at by applying weights to security objectives addressed at relevant layers.

The security capabilities and the class of the mobile device are conveyed by a certificate, which is signed by a Trusted Third party. The certificate establishes: 1) the security capabilities of the device, 2) the class of the device, 3) the credentials of the device, and 4) that the device has been authenticated by Trusted Third Party.

The certificate is issued when the device is shipped out from the manufacturer. Hence, in order to upgrade the security class of the mobile device, the ROM image must be upgrade with the appropriate security features and the device must undergo the process of audit and re-certification.

An example of a mobile device security classification table based on which the metric can be developed is shown in Tables 1 to 5, each table corresponding to one of the five factors that govern information security.

TABLE 1

SECURITY PARAMETER: AUTHENTICATION

| DEVICE CLASS | AUTHENTICATION MECHANISMS | PROXIMITY BASED SECURITY MECHANISMS |
|---|---|---|
| Class A | UserName/password PIN based Cookie Support | NIL |
| Class B | UserName/password PIN based | NIL |

TABLE 1-continued

SECURITY PARAMETER: AUTHENTICATION

| DEVICE CLASS | AUTHENTICATION MECHANISMS | PROXIMITY BASED SECURITY MECHANISMS |
|---|---|---|
| Class C | Application Specific authorizations mechanisms Username/password PIN Biometrics Smart cards | NIL |
| Class D | Username/password Biometrics Smart cards Next generation user identification mechanisms (Heuristic based user identification) | Provide a means to lock the device automatically if the device owner strays away from the device based on distance as well as time. |

TABLE 2

SECURITY PARAMETER: AUTHORIZATION

| DEVICE CLASS | AUTHORIZATION MECHANISMS |
|---|---|
| Class A | Support for single user profile |
| Class B | Application level authorization mechanisms |
| Class C | Allow access to device resources based on the users authentication credentials. Allow only certified applications to get installed and run on the device. Lock the device if unauthorized attempts are made to access the device. |
| Class D | Allow access to device resources based on the users authentication credentials. Allow only certified applications to get installed and run on the device. Lock the device if unauthorized attempts are made to access the device. Delete confidential data on the device if unauthorized attempts are made to access the device. |

TABLE 3

SECURITY PARAMETER: CONFIDENTIALITY

| DEVICE CLASS | DATA STORAGE SECURITY | DATA TRANSIT SECURITY | DATA TRANSIT SECURITY |
|---|---|---|---|
| Class A | NIL | NIL | NIL |
| Class B | Application level security | Application layer security (HTTPS) | OS level support for: Certificate store |
| Class C | OS level support for: encryption/ decryption of file system data application level security | OS level support for: Network layer security (IPSEC) Transport layer security (SSL) Application layer security (HTTPS) Custom encryption IR/VPN/WLAN/ Bluetooth | OS level support for: Key Generation Key storage Certificate storage |
| Class D | OS level support for: encryption/ decryption of file system data application level security | OS level support for: Network layer security (IPSEC) Transport layer security (SSL) Application layer security (HTTPS) Custom encryption IR/VPN/WLAN/ Bluetooth | OS level support for: Key Generation Key storage Certificate storage |

TABLE 4

SECURITY PARAMETER: INTEGRITY

| DEVICE CLASS | INTEGRITY MECHANISMS |
|---|---|
| Class A | Minimal Support for Virus Scanning |
| Class B | Virus Scanning |
| | Support for Application level remote device administration |
| | Applications must comply with a set of security policies. |
| Class C | Prevent unsafe code from running on the device |
| | Virus Scanning |
| | Data and Application integrity |
| | Remote Device Administration |
| | Applications must comply with a set of security policies |
| | OEM provides certificate-verifying features in the OS to determine if a particular application is allowed to run or not on the device |
| | Hardware Integrity |
| Class D | Prevent unsafe code from running on the device |
| | Virus Scanning |
| | Data and Application integrity |
| | Remote Device Administration |
| | Applications must comply with a set of security policies. |
| | The OEM should provide certificate-verifying features in the OS to determine if a particular application may be allowed to run or not on the device. |
| | Hardware Integrity |

TABLE 5

SECURITY PARAMETER: NON-REPUDIATION

| DEVICE CLASS | NON-REPUDIATION MECHANISMS |
|---|---|
| Class A | NIL |
| Class B | Digital certificate based mechanism |
| | Logging support |
| Class C | Digital certificate based mechanism |
| | Logging support |
| Class D | Digital certificate based mechanism |
| | Logging support |
| | Other standard non-repudiation mechanisms. |

Figure 6:
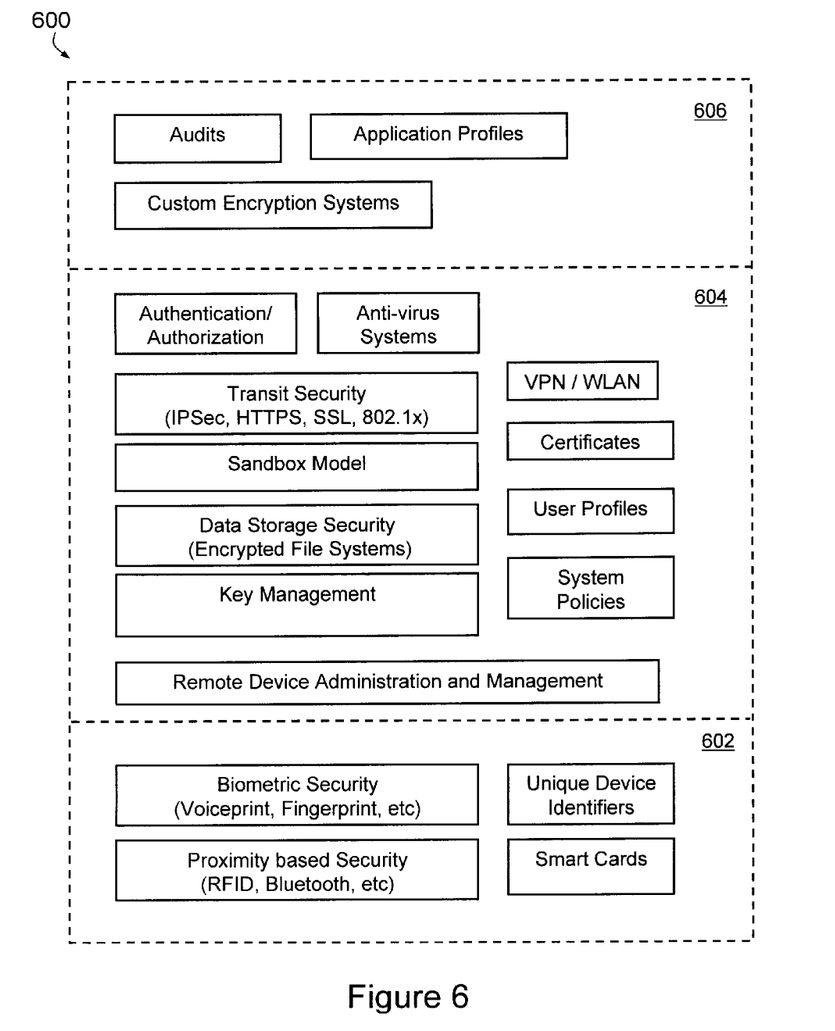
FIG. 6 is a schematic representation of the configuration of an exemplary Class B mobile device according to the system of FIG. 1 in accordance with an embodiment of the present invention.

In addition, an example of a configuration of a Class B mobile device according to these parameters is shown schematically at 600 in FIG. 6, in which are depicted the aforementioned Hardware Layer/OEM Layer 602, the OS Layer 604 and the Application Layer 606. The Hardware Layer/OEM Layer 602 includes the following components:

Biometric Security (Voiceprint, Fingerprint, etc)
Proximity based Security (RFID, Bluetooth, etc)
Unique Device Identifiers
Smart Cards The OS Layer 604 includes the following components:

Authentication/Authorization
Anti-virus Systems
Transit Security (IPSec, HTTPS, SSL, 802.1x)
Sandbox Model
Data Storage Security (Encrypted File Systems)
Key Management
VPN/WLAN
Certificates
User Profiles
System Policies
Remote Device Administration and Management The Application Layer 606 includes the following components:

Audits
Application Profiles
Custom Encryption Systems

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A method of controlling access to computing resources, comprising:
    providing a first computing device with access to a database containing data indicative of a plurality of computing resources access to which is controlled by said first computing device and a minimum level of required security capability that a second computing device must possess to be provided with access to said respective computing resources;
    assigning said second computing device a security capability;
    determining security audit data in real-time, after manufacture of the second computing device, the security audit data including at least current hardware and software configuration and current software state of the second computing device;
    providing said second computing device with data indicative of said security capability;
    configuring said first computing device to respond to receiving said data indicative of said security capability and data indicative of a desired access from said second computing device by ascertaining the minimum level of required security capability corresponding to said desired access and by comparing said minimum level of required security capability with said security capability of said second computing device; and
    providing said desired access if said security capability of said second computing device meets said minimum security capability for said desired access.

2. A method as claimed in claim 1, further comprising transmitting a message indicating a desired access from said second computing device to said first computing device, and subsequently transmitting said data indicative of said security capability data to said first computing device upon request of said first computing device.

3. A method as claimed in claim 1, including assigning the security capability of said second computing device according to a metric for categorizing said second computing device depending on compliance of said second computing device with a set of security standards and security requirements.

4. A method as claimed in claim 1, including storing said data indicative of said security capability in a digital certificate.

5. A method as claimed in claim 4, including storing said digital certificate in a trusted platform module chip provided in said second computing device.

6. A method as claimed in claim 1, including the first computing device sending a request to the second computing device for security audit data, the security audit data including at least the current hardware and software configuration and the current software state of the second computing device.

7. A method as claimed in claim 6, including the second computing device generating said security audit data by conducting a security audit during use of the second computing device, after manufacture of the second computing device, in a secure area of the second computing device upon receiving said request.

8. A method of requesting access to a remote computing resource from a user computing device, comprising:
provided said user computing device with data indicative of a security capability of said user computing device, the security capability verified after manufacture of the user computing device by cross checking against real-time security audit data, and the security audit data including at least current hardware and software configuration and current software state of the user computing device;
transmitting to a remote computing device said security capability and data indicative of a desired access, so that said remote computing device can assess whether said security capability meets a minimum level of required security capability specified for said desired access; and
receiving data indicative of allowance of said desired access if said security capability meets said minimum level of required security capability specified for said desired access.

9. A method as claimed in claim 8, including receiving electronically a request for security audit data pertaining to said user computing device from said remote computing device.

10. A method as claimed in claim 9, including generating said security audit data by conducting a security audit upon receiving said request, and transmitting said security audit data to said remote computing device.

11. An access control system for controlling access to a computing resource from a user computing device, comprising:
an access server;
a database accessible by said access server containing data indicative of a plurality of types of computing resources access to which is controlled by said access server and of a minimum level of required security capability that said user computing device must possess to be granted said respective types of access to said access server, the security capability determined in real-time using at least security audit data, after manufacture of the user computing device, and the security audit data including at least current hardware and software configuration and current software state of the user computing device;
wherein said access server is configured to receive data indicative of said security capability and data indicative of a desired access from said user computing device, to ascertain from said database the minimum level of required security capability corresponding to said desired access, to compare said minimum level of required security capability with said security capability of said user computing device, and to provide said desired access if said security capability of said user computing device meets said minimum security capability for said desired access.

12. A system as claimed in claim 11, wherein said data indicative of a security capability of said user computing device is in the form of data indicative of a security capability classification.

13. A system as claimed in claim 11, including memory provided in said user computing device containing said data indicative of said security capability of said user computing device.

14. A system as claimed in claim 11, wherein said access server is configured to send a request to said user computing device for security audit data.

15. A system as claimed in claim 14, wherein said request is adapted to prompt said user computing device to generating said security audit data by conducting a security audit upon receiving said request.

16. A user computing device for use in accessing a remote computing resource, comprising:
a telecommunications module for accessing said remote computing resource;
a processor in data communication with said telecommunications module; and
software executable on said processor;
wherein said user computing device is controllable to transmit a request for access to said remote computing resource, to receive in response a request for security data pertaining to said user computing device software from or on behalf of said remote computing resource, and to respond to said request by returning said security data, the security data determined using real-time security audit data, after manufacture of the user computing device, and the security audit data including at least current hardware and software configuration and current software state of the user computing device.

17. A user computing device as claimed in claim 16, wherein said user computing device is further adapted to respond to said request by conducting a security audit of said user computing device to generate security audit data and subsequently to return said security audit data either as said security data or as a component of said security data.

18. A computer readable medium storing non-transient program data that, when executed by a processor on a computing device, implements a method as defined in claim 1.

19. A computer readable medium storing non-transient program data that, when executed by a processor on a computing device, implements a method as defined in claim 8.

20. A method as claimed in claim 1, further comprising executing program code in a trusted environment, the program code measuring security.

21. A method as claimed in claim 1, further comprising the second computing device undergoing audit and re-certification to upgrade the security class of the mobile device.

* * * * *